United States Patent
Bamesberger

(10) Patent No.: US 8,521,342 B2
(45) Date of Patent: Aug. 27, 2013

(54) ELECTRONIC TECHNICAL LOGBOOK

(75) Inventor: Abderrazak Bamesberger, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 85 days.

(21) Appl. No.: 12/789,299

(22) Filed: May 27, 2010

(65) Prior Publication Data

US 2010/0268413 A1    Oct. 21, 2010

Related U.S. Application Data

(63) Continuation of application No. PCT/EP2007/063021, filed on Nov. 29, 2007.

(51) Int. Cl.
  *G05D 1/00*    (2006.01)
(52) U.S. Cl.
  USPC ............................. 701/3; 701/31.4; 701/33.4
(58) Field of Classification Search
  USPC ................. 701/3, 29, 31, 33, 35, 29.1, 31.4, 701/31.5, 32.6, 32.7, 32.8, 33.4, 34.4; 709/203
  See application file for complete search history.

(56) References Cited

U.S. PATENT DOCUMENTS

| | | |
|---|---|---|
| 6,487,479 B1 | 11/2002 | Nelson |
| 6,795,408 B1 | 9/2004 | Hiett |
| 6,901,377 B1 | 5/2005 | Rosenfeld et al. |
| 6,938,823 B2 | 9/2005 | Boccacci |
| 2001/0056443 A1* | 12/2001 | Takayama et al. ............ 707/513 |
| 2002/0046214 A1* | 4/2002 | Sandifer .................... 707/104.1 |
| 2002/0103865 A1* | 8/2002 | Lilly ............................. 709/205 |
| 2002/0123915 A1 | 9/2002 | Denning et al. |

(Continued)

FOREIGN PATENT DOCUMENTS

| | | |
|---|---|---|
| CN | 1465954 A | 1/2004 |
| RU | 1758 U1 | 2/1996 |

(Continued)

OTHER PUBLICATIONS

First Office Action for CN Application No. 200610083089.8 issued Mar. 9, 2010.

(Continued)

*Primary Examiner* — Khoi Tran
*Assistant Examiner* — Jason Holloway
(74) *Attorney, Agent, or Firm* — Ingrassia Fisher & Lorenz P.C.

(57) ABSTRACT

A system, a method, and a computer program are provided for recording technical issues of an aircraft. A server unit is adapted to store and output data related to technical issues of an aircraft. A client unit sends an access request to a server, which receives and processes this request, permits access to the data and restricts the adding or modifying processing of the data to one client unit at a time. For use during flight tests on board of the aircraft, a snapshot of the data may be transferred to a mobile computer, while the data on the server unit is restricted to read-only. After the flight test, the modified data is transferred back to the server unit and the read-only restriction is removed.

11 Claims, 5 Drawing Sheets

(56) References Cited

U.S. PATENT DOCUMENTS

| | | | |
|---|---|---|---|
| 2002/0138184 A1* | 9/2002 | Kipersztok et al. | 701/29 |
| 2002/0143443 A1* | 10/2002 | Betters et al. | 701/29 |
| 2003/0041155 A1 | 2/2003 | Nelson et al. | |
| 2003/0195678 A1* | 10/2003 | Betters et al. | 701/29 |
| 2003/0225492 A1* | 12/2003 | Cope et al. | 701/35 |
| 2004/0039499 A1* | 2/2004 | Felke et al. | 701/29 |
| 2004/0199307 A1* | 10/2004 | Kipersztok et al. | 701/29 |
| 2005/0027826 A1 | 2/2005 | Loda et al. | |
| 2007/0112488 A1* | 5/2007 | Avery et al. | 701/35 |
| 2010/0121938 A1 | 5/2010 | Saugnac | |
| 2010/0125468 A1* | 5/2010 | Avery et al. | 705/7 |

FOREIGN PATENT DOCUMENTS

| | | |
|---|---|---|
| RU | 37852 U1 | 5/2004 |
| RU | 2250511 C1 | 4/2005 |
| RU | 2257613 C2 | 7/2005 |

OTHER PUBLICATIONS

International Search Report for PCT/EP2007/063021 mailed Jun. 11, 2008.

Clinton, J.T. "The Revolution of the Aircraft Engine Ground Maintenance Station," Aerospace Conference, IEEE Proceedings, Piscataway, NJ. Mar. 10-17, 2001. p. 2927-2935, vol. 6.

Mathur, A., et al. "An Integrated Support System for Rotorcraft Health Management and Maintenance," Aerospace Conference, IEEE Proceedings, Piscataway, NJ. Mar. 18-25, 2000. pp. 1-8, vol. 6.

Nicolai, T., et al. "Case Study of Wearable Computing for Aircraft Maintenance," 2nd International Forum on Applied Wearable Computing, Zurich Switzerland. Mar. 2005. pp. 1-14.

Russian Office Action, dated Nov. 1, 2011 for Russian Application No. 20100126540/08.

Japan Patent Office, Notice of Reasons for Rejection dated Jul. 17, 2012 for Japanese Patent Application No. 2010-535242.

Russian Patent Office, Russian Office Action Dated Mar. 19, 2012 for Russian Patent Application No. 2010126540/08.

* cited by examiner

ELECTRONIC TECHNICAL LOGBOOK

CROSS-REFERENCE TO RELATED APPLICATIONS

This is a continuation of International Application No. PCT/EP2007/063021, filed Nov. 29, 2007, which is hereby incorporated by reference in its entirety.

TECHNICAL FIELD

This invention relates to a system, a method and a computer programme for recording technical issues of an aircraft.

BACKGROUND

A technical logbook is used during aircraft test commencing with the final assembly line operational test and ending with the delivery to the customer. During this "flight line phase," all technical issues and their solutions must be recorded in the technical logbook, checked by the quality department as having been correctly performed and accepted by the crew. The technical logbook is in the vicinity of the aircraft and on board when the aircraft is in flight. Usually the technical logbook is a book type document made of paper and has to be unique for each aircraft.

The main disadvantage in using paper made logbooks is the effort in gaining access to the logbook by flight test or development engineers who need to look into the logbook while it needs to be in the vicinity of the aircraft. During the flight and shortly after the flight no other person than in the flight crew can access the logbook. Also, since various people usually write in the logbook, difficulties in reading all the entries can occur. Thus there is a need for a new kind of technical logbook to eliminate the problems discussed above.

It is therefore at least one object of the invention to provide a system, a method and a computer program for recording technical issues of an aircraft, which enables easy access to the recorded data while not allowing for modification by more than one person at a time. It is at least another object of the invention to provide a system, a method and a computer program for recording technical issues of an aircraft, restricting the access to the data for different groups of people. Since usually a number of engineers or flight test crew members need to gain access to only specialised data about technical issues, e.g., only aircraft engine data, it would be advantageous to tailor the access of each user to the user's requirements. In addition, other objects, desirable features, and characteristics will become apparent from the subsequent summary and detailed description, and the appended claims, taken in conjunction with the accompanying drawings and this background.

SUMMARY

A system is provided for recording technical issues while improving the accessibility, usability and readability. The system comprises: at least one server unit, at least one client unit, wherein the at least one server unit is adapted to store and output data related to technical issues of at least one aircraft, wherein the at least one client unit is adapted to send an access request to the at least one server unit to access and process the data; wherein the at least one server unit is adapted to receive and process the access request from the at least one client unit; wherein the at least one server unit is adapted to permit access to the data, and wherein the at least one server unit is adapted to restrict adding or modifying processing of the data for each particular aircraft to one client unit at a time.

The server unit stores all technical issues that are inputted via a client unit and is capable to output the data upon request. This eases up the usage of a logbook, compared to a logbook made of paper. A user may use a simple interface on a client unit like a workstation, which may provide help for necessary items. Every other user may access this information, e.g., from their personal workstation. In case a user is modifying the data related to technical issues of an aircraft, other users are prohibited from modifying the same data at the same time. Thus, this leads to a system that has the same modification restrictions like a logbook made of paper, but allows the consultation of older data and might lead to certification of this system as a replacement for the usual paper logbook.

Preferably, the server unit is adapted to transfer a snapshot of the data related to an aircraft to a client unit for modification during flight tests. This enables the flight test crew to use a logbook during flight tests, represented by an application on the client unit brought on board the aircraft, which may access and modify the snapshot of the original data.

Further preferred is the server unit being adapted to receive a modified snapshot of the data related to an aircraft from a client unit after usage during a flight test. In order to effect a change of the original data on the server unit after the snapshot has been modified during a flight test, the modified snapshot must be transferred to the server unit, replacing the original data or replacing parts of the original data.

Still further preferred is, that the system according the present invention is adapted to restrict the access to the data to read-only after a snapshot of the data has been transferred to a client unit and before the snapshot has been transferred back to the server unit after the flight test. Thus, parallel modifications are avoided.

Also, the client unit is preferably a mobile computer, enabling the flight test crew to easy take the client unit on and off board the aircraft.

In a preferred embodiment, the client unit is a workstation, which is dedicated to a work-place in a flight test line for a specific aircraft or to an office workplace. Dedicated workstations may be exclusively used for the purpose of the (delivery) flight line whereas a standard workstation at an office workplace enables, e.g., a development engineer to access a logbook from his office, without needing to find and copy a paper based logbook.

It is preferred, that the server unit is adapted to restrict access to the data according to user permissions. The user permissions may be set depending on the user's requirements, qualification and function of the employee and/or disclosure policy within the company.

A method is also provided for recording technical issues of an aircraft, said method comprising following steps: sending an access request from a client unit to the server unit to ac-cess and process the data related to technical issues of at least one aircraft, receiving and processing the access request from the client unit by the server unit, restricting adding or modifying processing of the data for each particular aircraft to one client unit at a time by the server unit.

It is preferred, that a dataset for storing information about technical issues of an aircraft in the at least one server unit at the beginning of the flight testing programme is created and is closed after finishing the flight test program.

Preferably, the requested data is a snapshot of the data related to the technical issues, the server unit sets the dataset to read-only after sending it to the client unit, the client unit modifies the data during a flight test and sends the modified data back to the server unit, which removes the read-only state from the dataset.

A computer program is also provided for recording technical issues of an aircraft for carrying out the steps according to the method described above, when the computer programme is run on a computer, comprising: a first program code for sending an access request from the at least one a client unit to the at least one server unit to access and process the data related to technical issues of at least one aircraft, second program code for receiving and processing the access request from the client unit by the at least one server unit, third program code means for permitting access to the data, and fourth program code means for restricting adding or modifying processing of the data for each particular aircraft to one client unit at a time by the at least one server unit.

Preferentially the computer program is adapted to perform one or several of the above mentioned preferred steps and embodiments of the method for planning and controlling of objects transportation.

BRIEF DESCRIPTION OF THE FIGURES

The present invention is illustrated by way of example and not limitation in the accompanying figures, in which references indicate similar elements, and in which.

DETAILED DESCRIPTION

The following detailed description is merely exemplary in nature and is not intended to limit the application and uses. Furthermore, there is no intention to be bound by any theory presented in the preceding background or summary or the following detailed description.

In accordance with the present invention, the embodiment shown provides for efficiently recording technical issues of an aircraft during the flight line phase while improving the accessibility and readability of the data, thus maximizing the usability. In the following, the system, the method and the computer programme are also referred to as "digital technical logbook" or "electronic logbook".

A digital technical logbook for use during the flight line phase before delivering the aircraft to the customer with a maximum usability for participating staff would be very advantageous. In order to achieve a system for providing a digital technical logbook while meeting the requirements of the aviation authorities, that are still related to paper made logbooks, it is needed to form a system, which provides unique logbooks for each aircraft while maintaining the ease of use compared to paper based logbooks.

Figure 1:
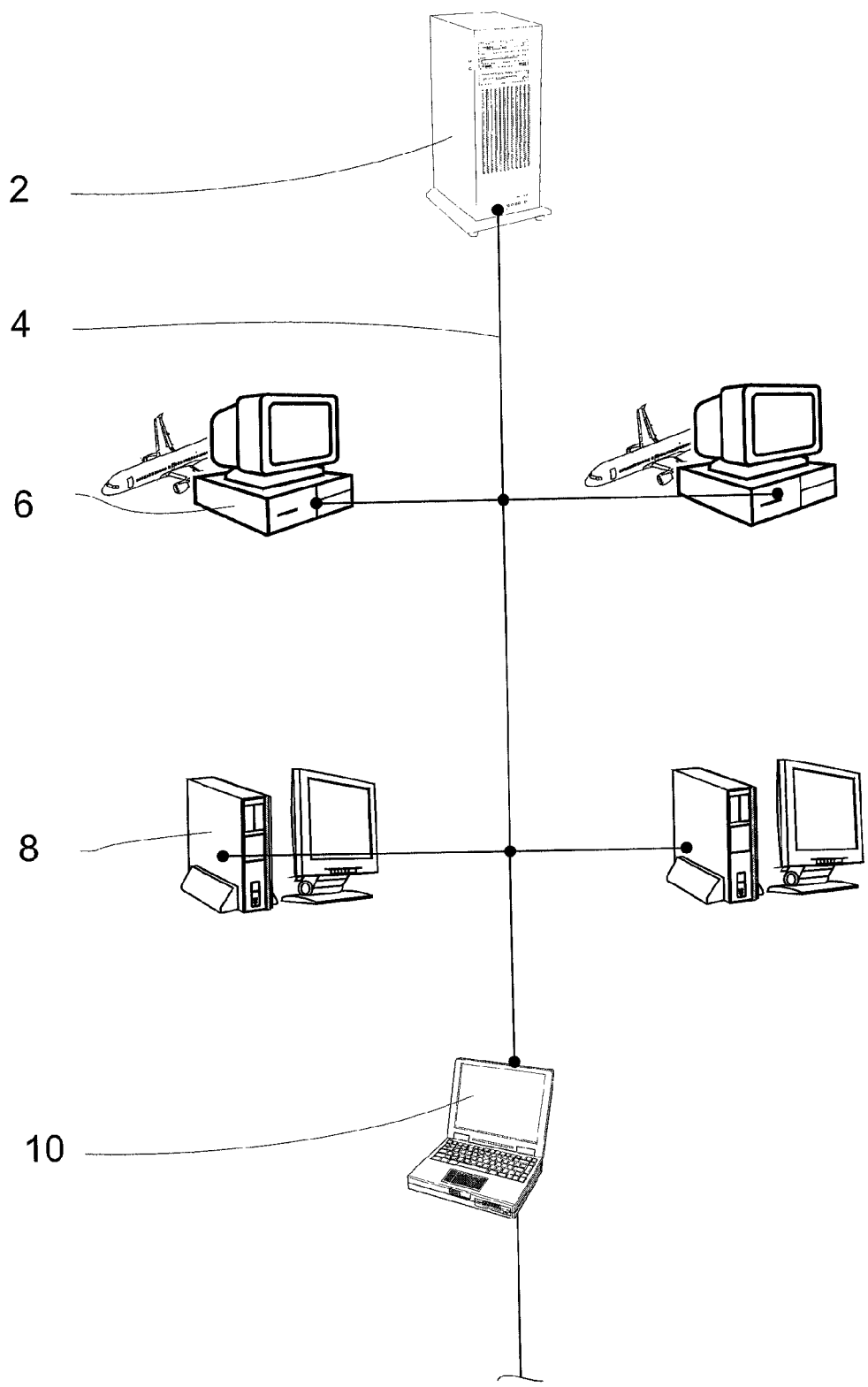
FIG. 1 illustrates the general technical architecture of the system according to an embodiment of the present invention in a schematic drawing.

FIG. 1 shows a schematic drawing of a system in accordance with the present invention. Shown is a server 2 on which database applications are installed and running. The server 2 is attached to a network 4 through which the server may be accessed. This network may be realized with a TCP/IP network protocol, which is commonly used in a broad variety of applications.

Directly in the vicinity of the tested aircraft dedicated workstations 6 are located. These workstations are each dedicated to an application accessing the electronic logbook for only one aircraft. They are mainly used to create and answer occurring items. These dedicated workstations are, e.g., used by staff responsible for the aircraft and the aircraft's flight line phase (e.g., manufacturing, design, quality assurance, flight test engineers).

Workstations may generally be seen as clients or client units in the context of this disclosure. They run software that provides a user interface with customised or customisable forms allowing the user to input data related to technical issues in an aircraft, thus communicating with server 2 over the network 4.

In case flight test engineers, who are not directly in the vicinity of the aircraft, need to consult the electronic logbook of an aircraft they must be able to access logbooks from their usual workspace. Also, if other staff want to look into various electronic logbooks in order to consider permanently occurring items, e.g., during the development process of new aircraft it is also necessary to enable their access to the logbooks as well. Therefore they must be able to connect to server 2 by network 4 through their standard workstations 8. These standard workstations are located in the user's office and are mainly used for consultation of the technical logbook. Only according to user profiles modifications on the logbook will be authorized. It seems to be very useful to restrict the access for all staff that is not responsible for the aircraft and its flight line phase to read-only/consultation mode of the logbook, so they may not create and/or answer items.

Concerning the connection of the dedicated workstations 6 and the standard workstations 8 to the server 2 it might be useful to distinguish the moment of user authentication. Dedicated workstations 6 may authenticate each user "in posteriori" due to the possible number of flight test engineers and staff members in the vicinity of the aircraft. This means that at dedicated workstations the user is always identified at the time of modifying and saving data. At standard workstations it is useful to authenticate the user "a priori", because each standard workstation usually belongs to only one user that may be authenticated before entering the electronic logbook without needing to authenticate after every data processing.

For flight test engineers it is necessary and required by the aviation authorities to use a technical logbook on board during flight tests. This may be achieved with a notebook computer 10 on which a snapshot of the electronic logbook data is downloaded. This means that the whole database content for the specific aircraft to be flight tested will be stored on the notebook computer 10 that runs software accessing this snapshot. During the flight the aircraft test engineer may input all technical issues that occur during the flight into the notebook computer 10 like into a paper based logbook. After termination of the flight test the notebook computer 10 will be hooked up to the network 4 in order to upload the modified snapshot of the technical logbook to the server 2.

It is mandatory to prevent modification of the technical logbook during the flight test, when it is used on the notebook computer 10, as explained further below. A standard paper based logbook which is on board during flight test can also not be modified by anybody on the ground. With this invention it is still possible for dedicated workstations 6 and standard workstations 8 to access all the data on the server 2 like browsing through paper copies of a paper based logbook.

Thus, all test and development engineers on the ground are always able to look into specific logbooks without effort.

Figure 2:
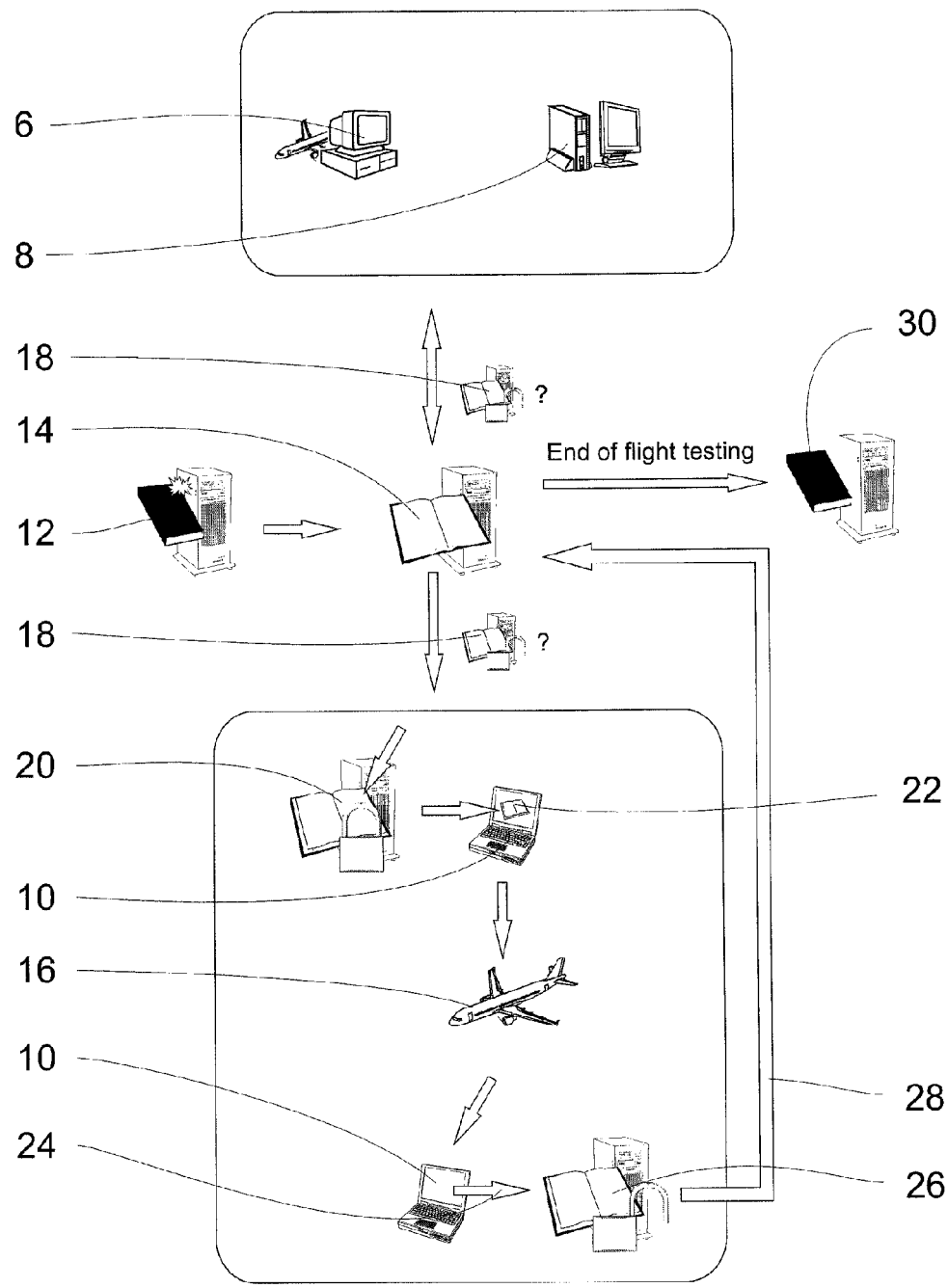
FIG. 2 shows the method of recording technical issues of aircraft with focus on flight test according to an embodiment of the present invention in a schematic drawing.

FIG. 2 shows the functional architecture of the system according to the present invention and focuses primarily on the integration of a notebook computer 10 for performing the recording of technical issues during flight tests.

At the beginning of the flight test operational period within the final assembly line, a technical logbook is created in the server 2, illustrated by reference 12. This means a dataset with several tables to store and sort data will be created using a database application. Each logbook is dedicated to only one aircraft, represented by a manufacturing serial number (MSN) etc. For each aircraft there must be a single and unique logbook. The technical logbook instantaneously reaches the "open" status in order to enable users to record technical issues in it 14.

A technical logbook in server 2 may be accessed by dedicated workstations 6, standard workstations 8 and notebook computers 10 for use in flight. Here, FIG. 2 focuses on the aspect usage during flight.

For a flight test the logbook must be taken on board. This is done by downloading the dataset for the tested aircraft 16 from the server 2 onto the notebook computer 10, if it is in an "unlocked" state 18. In parallel, the logbook for the aircraft must be locked within the server 2 in order to prevent parallel inputs on the ground, while the aircraft is in flight. During the flight only reading/consulting access will be allowed if the logbook is in a "locked" state. For this, a "locked" file flag, database flag or such is set 20 within the server 2 that the server 2 checks upon request of data concerning each aircraft. The notebook computer 10 now has a snapshot of the dataset representing the logbook for usage on board 22. During the flight, the flight crew may access the logbook locally on the notebook computer 10 just as a paper based logbook.

After finishing the flight test the data from the notebook computer 10 will be transferred through the network (FIG. 1) back to the server 2. After completion of the transfer, the locally saved and modified snapshot on the notebook computer 24 will be deleted. Since the server 2 now has all relevant and recent data for the tested aircraft and since modification now has been finished, the related logbook may be set "unlocked" (open) again 26. The logbook is ready for full access again 28.

After all flight tests, the technical acceptance completion and shortly before or after the aircraft has been delivered to the customer, the logbook for the specific aircraft will be closed 30.

The logbook may be read-accessed every time. The consultation of the logbook does not depend on the status of the aircraft. It may be accessed for modification only if the server 2 determines the "open/unlocked" state 18.

Figure 3:
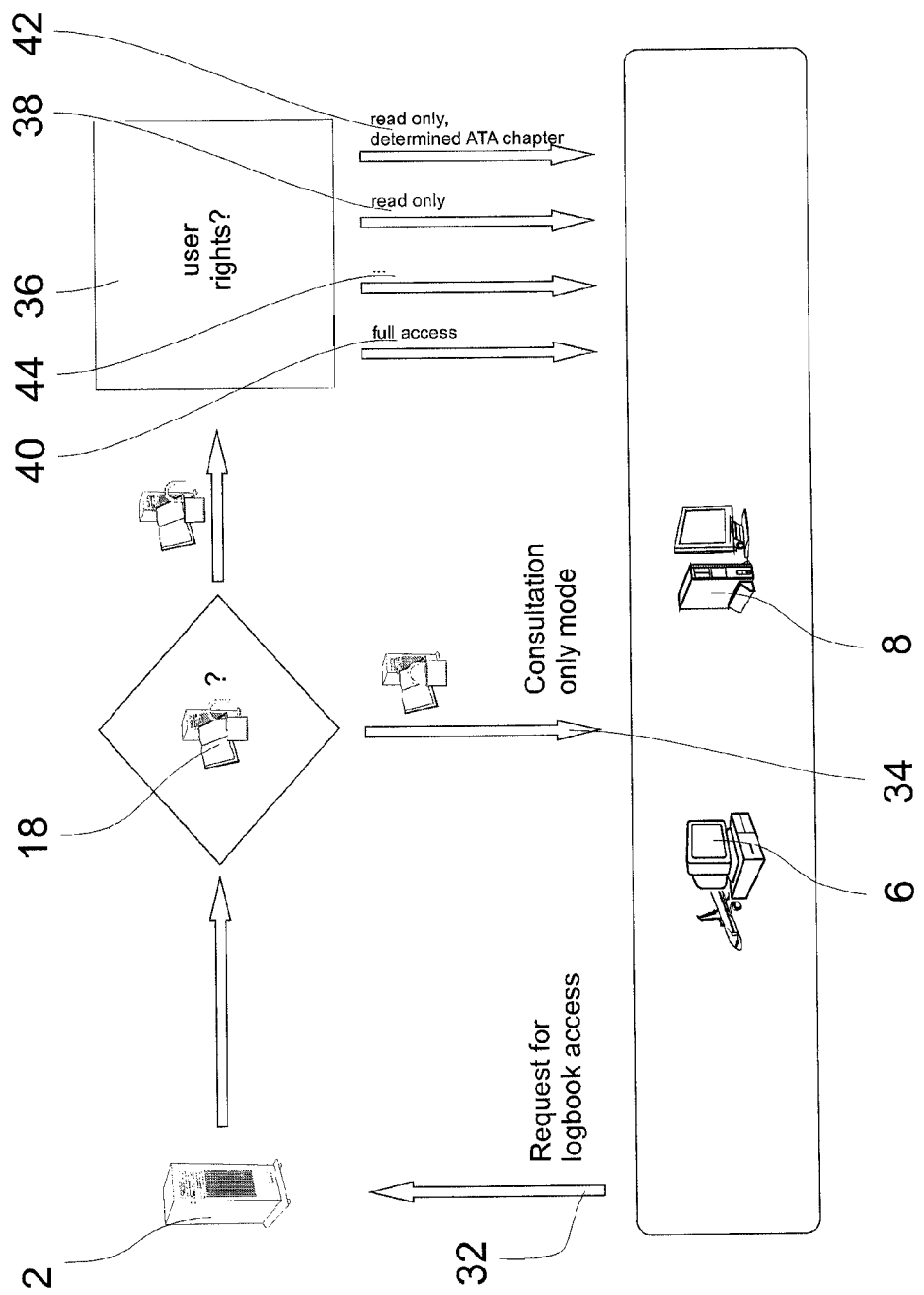
FIG. 3 shows the method of accessing a logbook through a workstation in a schematic drawing.

In FIG. 3 it is shown, how workstations 6, 8 may gain access to a specific logbook on the server 2. A workstation 6 or 8 sends 32 a request for accessing the logbook to the server 2. The server 2 receives the request and determines 18, whether the specific logbook is in a "locked" or "closed" state or not. If the logbook is locked or closed, e.g. because it is "in flight" (s. FIG. 2) it may only be consulted, but not modified 34. In case the logbook is open 26 the server 2 further determines, what permissions the request filing user has 36.

By an administrator, several different user profiles, each with certain permissions, may be given. All staff that are not responsible for the aircraft should only have read-only/consultation access 38 while members of the responsible flight line staff should be enabled to have full access 40. Apart from that it is possible to enable third-parties, like engine manufacturers etc. to consult a logbook, but filter the information according to the corresponding ATA chapter or other criteria 42. Further other user rights 44 may be adjusted by the administrator by adding or modifying profiles, different groups and reference tables.

Figure 4:
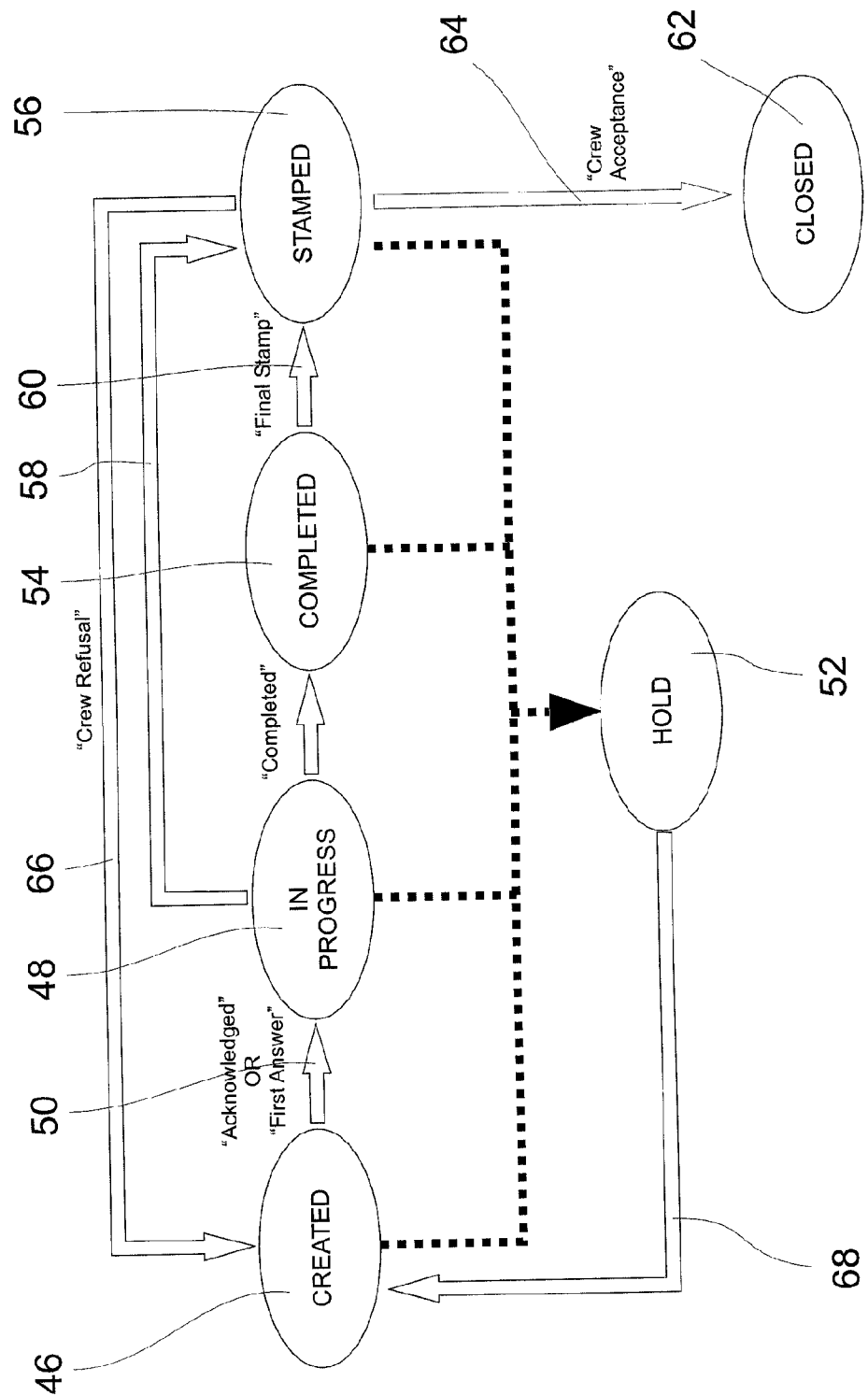
FIG. 4 shows an item process in general.

The recording of technical issues into an electronic logbook comprises the creation of an item for each technical issue within the electronic logbook. FIG. 4 demonstrates the interaction of a test crew and items.

At first, if a technical issue occurs, a so-called item is created, representing the technical issue. Every item may have different states depending on the progress of solving the related issue. The status of an item may be "created", "in progress", "completed", "stamped", "hold" or "closed". All items must be closed and checked by the quality assurance staff at the end of flight testing of the aircraft. Then, the crew has validated all answers to all items.

When the item has been created 46 a job description for this item is necessary. Optional, a corrective action to be done may be specified, but this is not obligatory. For helping the user in supplying correct data, job cards or preformatted texts in accordance with the chapters of the Air Transport Association (ATA) may be provided. From the "created" status the item may reach the status "in progress" 48 by crew acknowledgement or a first answer to the issue 50. Alternatively the status of the item may be set to "hold" 52, which means the crew temporarily closes the item for flight clearance.

Items in progress 48 reach the status "completed" 54 upon completion of the work related to the job description. It may also be possible to reach the status "stamped" 56 by directly performing a final stamp 58. Alternatively, items in progress 48 reach the "hold" status 52 if they are temporarily closed and not flight critical but time consuming, for example.

By stamping 60 "completed" items 54 they also reach the status "stamped" 56. "Completed" items 54 still may be set to "hold" 38 if stamping is not yet possible.

"Stamped" items 56 may reach the final status "closed" 62 only by crew acceptance of the item answer 64. For a solved item it is mandatory to provide means of signature for documentation the technical acceptance which leads into a final technical acceptance completion (TAC). It is yet again possible to set "stamped" items 56 to "hold" 52 or, by crew refusal 66, back to the status "created" 46. Items that are still in the "hold" status 52 prevent from reaching the status "closed" 62. By performing an automated report 68 "hold" items 52 may return to the status "created" 46.

By this method in creating, solving and closing items a broad variety of circumstances in occurring technical issues may be respected and help to improve the usability of an electronic logbook, provided by the described system, method and computer program. Secondarily there may be provided miscellaneous tools to improve the usability of the electronic technical logbook further. These may comprise, e.g., tools for aircraft inspection reports, customer acceptance, phase preparation tools, transferring data for technical logbooks between different plants of the aircraft manufacturing company and for technical logbook consultation.

Figure 5:
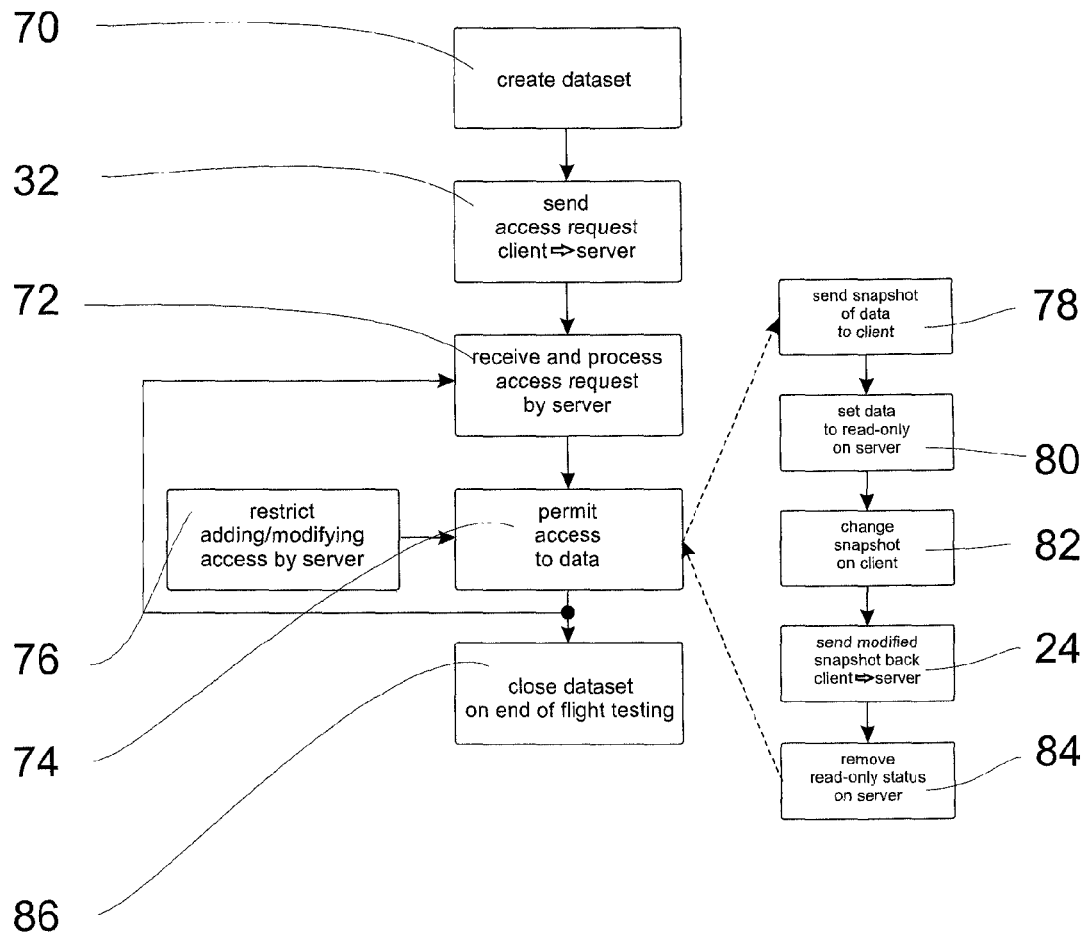
FIG. 5 shows the method for recording technical issues of an aircraft in a block diagram.

FIG. 5 finally shows the steps of the method for recording technical issues of an aircraft. At first, a dataset is created 70. The client unit sends 32 an access request to the server 2, which is receiving and processing 72 the request. According to user permissions the server 2 permits access 74 to the data and restricts adding and modifying access 76. In case a logbook is needed for a flight test, the server 2 sends 78 a snapshot of the data to the requesting client unit and further sets the data to read-only 80 on the server 2. On the client unit, preferably a notebook computer 10 that is mobile (i.e., a mobile computer), changes to the data are committed. After the flight test, the modified data are transferred back 24 to the server 2 and the read-only status is removed 84. After end of the flight line phase, the dataset and thus the electronic logbook will be closed 86.

Although the system, the method and the computer program are described using the embodiment of an electronic logbook for flight tests, the embodiments of the invention are not limited thereto. It is possible to use this logbook for a broad variety of applications, wherever documentation of technical issues is required, such as for maintenance or test of medical devices, power plants and motorised vehicles etc.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A system for recording technical issues of an aircraft, the system comprising:
   a ground-based server unit that stores and outputs data related to the technical issues of the aircraft; and
   a mobile client unit that sends an access request to the server unit to access and process the data,
   wherein the server unit further:
   receives and processes the access request from the client unit;
   permits access to the data by transferring a snapshot of the data related to the aircraft to the client unit, wherein the client unit that modifies the snapshot of data during a flight test;
   locks the data on the server unit for the aircraft to a single client unit at a time until the client unit transfers the modified snapshot of the data back to the server unit,
   wherein the server unit receives the modified snapshot of the data related to the aircraft from the client unit after usage during the flight test.

2. The system according to claim 1, wherein the server unit is adapted to restrict the access to the data to read-only after the snapshot of the data has been transferred to the client unit and before the modified snapshot of data has been transferred back to the server unit after the flight test.

3. The system according to claim 1, wherein the client unit is a mobile computer.

4. The system according to claim 1, wherein the client unit is a workstation that is dedicated to a workplace in a flight test line for the aircraft.

5. The system according to claim 1, wherein the server unit is adapted to restrict the access to the data according a user permission.

6. A method for recording technical issues of an aircraft, said method comprising:
   sending an access request from a mobile client unit to a ground-based server unit to access and process data that is a snapshot of data related to a technical issue of the aircraft;
   receiving and processing the access request from the client unit by the server unit;
   permitting access to the data by transferring a snapshot of the data related to the aircraft to the client unit, wherein the client unit that modifies the snapshot of data during a flight test;
   locking the data on the server unit for the aircraft to a single client unit at a time until the client unit transfers the modified snapshot of the data back to the server unit; and
   receiving the modified snapshot of the data related to the aircraft on the server unit from the client unit after usage during the flight test.

7. The method according to claim 6,
   wherein a dataset for storing information about technical issues of the aircraft in the server unit at the beginning of a flight testing program is created; and
   wherein the dataset is closed after finishing the flight testing program.

8. The method according to claim 6, wherein the server unit sets a dataset to a read-only state after sending to the client unit, and after the client unit sends the modified snapshot of data back to the server unit, the server unit removes the read-only state from the dataset.

9. A non-transitory computer readable medium embodying a computer program product, said computer program product comprising:
   a program for recording technical issues of an aircraft, the program for recording the technical issues of the aircraft configured to:
   send an access request from a client unit to a server unit to access and process data related to a technical issue of the aircraft;
   permit access to the data by transferring a snapshot of the data related to the aircraft to the client unit, wherein the client unit that modifies the snapshot of the data during a flight test;
   lock the data on the server unit for the aircraft to a single client unit at a time until the client unit transfers the modified snapshot of the data back to the server unit; and
   receive the modified snapshot of the data related to the aircraft from the client unit after usage during the flight test.

10. The non-transitory computer readable medium embodying the computer program product according to claim 9, wherein the program is further configured to restrict the access to the data to read-only after the snapshot of the data has been transferred to the client unit and before the modified snapshot of the data has been transferred back to the server unit after the flight test.

11. The non-transitory computer readable medium embodying the computer program product according to claim 9, wherein the program is further configured to restrict access to the data according a user permission.

* * * * *